Oct. 8, 1968  F. E. NULL  3,404,669
MISSILES AND DISCHARGE APPARATUS THEREFOR
Filed Jan. 4, 1966  6 Sheets-Sheet 1

INVENTOR.
FAY E. NULL
BY
ATTORNEYS

Oct. 8, 1968                F. E. NULL                3,404,669
                MISSILES AND DISCHARGE APPARATUS THEREFOR
Filed Jan. 4, 1966                          6 Sheets-Sheet 2

INVENTOR.
FAY E. NULL
BY Harry M. Saragovitz, Edward J. Kelly,
Herbert Berl, & Albert E. Connell Jr.
ATTORNEYS

INVENTOR.
FAY E. NULL

Oct. 8, 1968     F. E. NULL     3,404,669
MISSILES AND DISCHARGE APPARATUS THEREFOR
Filed Jan. 4, 1966     6 Sheets-Sheet 4

INVENTOR.
FAY E. NULL
BY
ATTORNEYS

Oct. 8, 1968 F. E. NULL 3,404,669
MISSILES AND DISCHARGE APPARATUS THEREFOR
Filed Jan. 4, 1966 6 Sheets-Sheet 5

INVENTOR.
FAY E. NULL
BY
ATTORNEYS

Oct. 8, 1968  F. E. NULL  3,404,669
MISSILES AND DISCHARGE APPARATUS THEREFOR
Filed Jan. 4, 1966  6 Sheets-Sheet 6

INVENTOR.
FAY E. NULL
ATTORNEYS

UNITED STATES PATENT OFFICE

3,404,669
Patented Oct. 8, 1968

3,404,669
MISSILES AND DISCHARGE APPARATUS THEREFOR

Fay E. Null, Shalimar, Fla., assignor to the United States of America as represented by the Secretary of the Army
Filed Jan. 4, 1966, Ser. No. 533,101
15 Claims. (Cl. 124—6)

ABSTRACT OF THE DISCLOSURE

A centrifugal launcher is provided for discharging missiles at supersonic speed velocities. The apparatus includes a delivery disc which is rotating at a slower speed than a discharge disc thereby to minimize damage to the missiles incident to their pickup for discharge.

---

The invention described herein may be manufactured, used, and licensed by or for the Government for governmental purposes without the payment to me of any royalty thereon.

The present invention relates to improvements in centrifugal guns, and more particularly to a nonexplosive type of missile and apparatus for discharging such a missile by centrifugal force.

Modern warfare is largely a matter of logistics and national economy. In recognition of this fact, and the further fact that saturation raids prove to be very expensive per enemy casualty because of the large amounts of metal that must be expended to blanket an area with lethal fragments, the present invention is proposed in an effort to reduce such cost.

In order to markedly reduce the cost of saturation raids, one expedient is to use smaller and lighter missiles. However, the lethality of such missiles is ineffective unless they can be projected at an extremely high rate of speed and dispersed in quantity. In anticipation thereof; the present invention proposes to utilize the well known principle of the centrifugal launcher wherein a mass traveling in a curved path is released at a point along that path at a linear velocity for travel along a tangential line. Although this principle is well recognized by the prior art, special techniques are required to utilize this principle in applications to release a large number of missiles per second at an extremely high velocity of the order of supersonic speeds and control the dispersal thereof for effective coverage thereby to repel massive enemy ground forces until strategic bombing can be accomplished.

Therefore, a primary object of the present invention is to provide a lightweight missile for use in saturation raids which is relatively inexpensive from a cost standpoint and highly effective to repel enemy ground forces.

Another object of the present invention is to provide apparatus for discharging a lightweight missile with a relatively high degree of accuracy by centrifugal force.

It is also an object of the present invention to provide a lightweight missile and a launching apparatus therefor which will discharge a plurality of missiles simultaneously, effectively, and successively at a higher rate of speed.

In addition thereto, it is an object of the present invention to provide a lightweight missile which produces relatively small drag, excellent flight stability and permits a multiplicity of rounds to be stored and carried in a relatively small space.

Still another object of the present invention is to provide a relatively small lightweight missile and apparatus for firing such missile at a high rate of speed and which will be highly effective, highly efficient in use, and yet relatively inexpensive and easy to manufacture.

According to one aspect of the present invention, a centrifugal launcher is provided which hurls missiles at supersonic speeds utilizing a two-step acceleration apparatus. This is accomplished by providing two discs which rotate in opposite directions. Missiles are fed from a storage or supply chamber to the rim of the one disc which is rotating at an intermediate speed. The missiles are then transferred to the rim of the other disc which is rotating at a supersonic speed. From this latter disc, the missiles are discharged in a tangential direction and slightly diverted to obtain coverage of the target area against which they are directed.

The novel features characteristic of the present invention, as well as additional objects and advantages thereof, will be understood better from the following detailed description when read in connection with the accompanying drawings in which.

Referring more particularly to the drawings, wherein similar reference characters have been used to designate corresponding parts throughout, there is shown and described a single, preferred embodiment of the present invention.

The principle of the centrifugal launcher is well known. It utilizes the tendency of a mass traveling in a curved path to maintain its linear velocity at a given point on the path when released along a tangential line from that point. Thus, it is only necessary to bring the mass up to the required velocity and to turn it loose in the desired direction. However, new and special techniques are required to apply a large number of missiles per second to a high velocity disc and, at the same time, accomplish the result with a structure which will possess plane portability.

Figure 1:
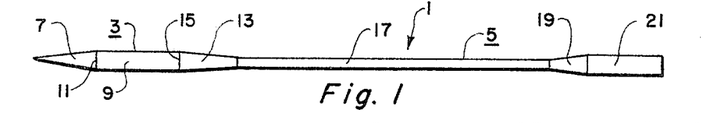
FIGURE 1 is a side view of a suitable supersonic missile in accordance with the present invention.

The present invention contemplates the use of a relatively small missile of a size comparable to a darning needle which is susceptible of being fired at supersonic velocity. A preferred embodiment of supersonic missile 1 for saturation raids on dispersed personnel is shown in FIGURE 1. The missile may comprise a long pyramid nose or head portion 3 to reduce shock wave drag, and a slender afterbody portion 5. These portions may be die castings which can be press fitted together or otherwise suitably assembled.

The head portion 3 comprises a long pyramidal portion 7 and a prismatic base portion 9. The long pyramidal portion 7 is made preferably from lead alloy to give it weight for stability. The configuration thereof is pyramidal for effective penetration and to reduce shock wave drag. The main prismatic part 9 of the head portion is square in cross section and is attached to the base or rear end 11 of the pyramidal portion. It is preferably made from magnetic material such as soft iron so that magnetic forces may be used in sorting and loading techniques.

The afterbody portion 5 is long and slender and is preferably made from aluminum alloy. It has the forward portion 13 attached to the rear end 15 of the base portion 9. The forward portion tapers inwardly and rearwardly to a long slender cylindrical intermediate portion 17 of reduced cross section. The rear end 19 of the afterbody tapers outwardly into a square end portion 21 of larger cross section which is of equal size to the head base portion 9.

For the purpose of illustration, dimensions typical of a missile contemplated by the present invention would be as follows: overall length 39.8 mm.; length of the pyramid portion 7, 4.45 mm.; length of the base portion 9, 6.54 mm.; cross section of the base portion, 1 mm. square; length of the afterbody forward portion 13, 2.67 mm.; length of the long portion 17, 20 mm.; cross section of the long portion, 0.4 mm. diameter; length of the rear portion 19, 2.3 mm.; length of the end portion 21, 5 mm.; and cross section of the end portion, 1 mm. square.

Thus, the design of this supersonic missile is such that its overall length is 39.8 mm.; the center of mass is located approximately 14 mm. from the forward end, and the center of lift is approximately 22 mm. from the forward end. Accordingly, the center of lift is well back of the center of gravity so that the missile will be stable and maintain its axis parallel to its flight path.

Figure 2:
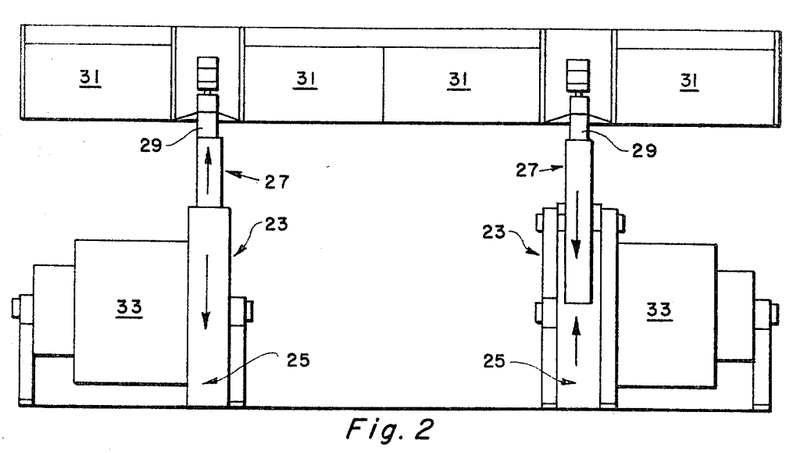
FIGURE 2 is a schematic view of one embodiment of a launcher for the fuselage of an airplane in accordance with the present invention.

Inasmuch as missiles, such as the one heretofore described, are intended for firing from an airplane, the present invention contemplates the use of a pair of centrifugal launchers 23. The launching discs of these launchers are made to rotate in opposite directions, in order that the respective gyroscopic torque effects thereof will cancel. The launchers are otherwise identical except that the arrangement permits one launcher to cover targets to the right of the line of flight and the other launcher discharges missiles to the left of the line of flight.

Figure 3:
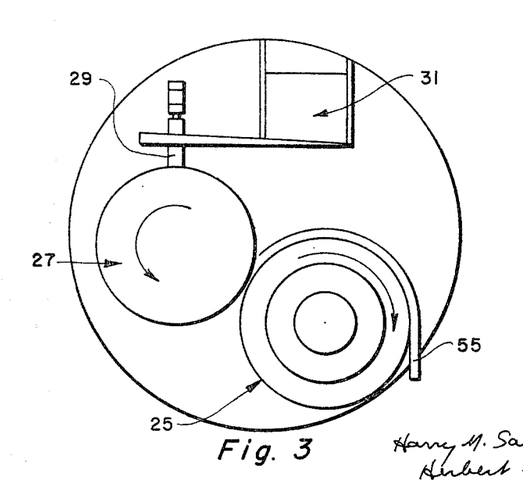
FIGURE 3 is an enlarged, schematic side view of one of the launchers shown in FIGURE 2.

Each one of the centrifugal launchers 23 comprises a launcher disc 25, a loader disc 27, feeder stacks 29, missile storage hoppers 31, and a power drive 33.

Figures 4, 5, 6:
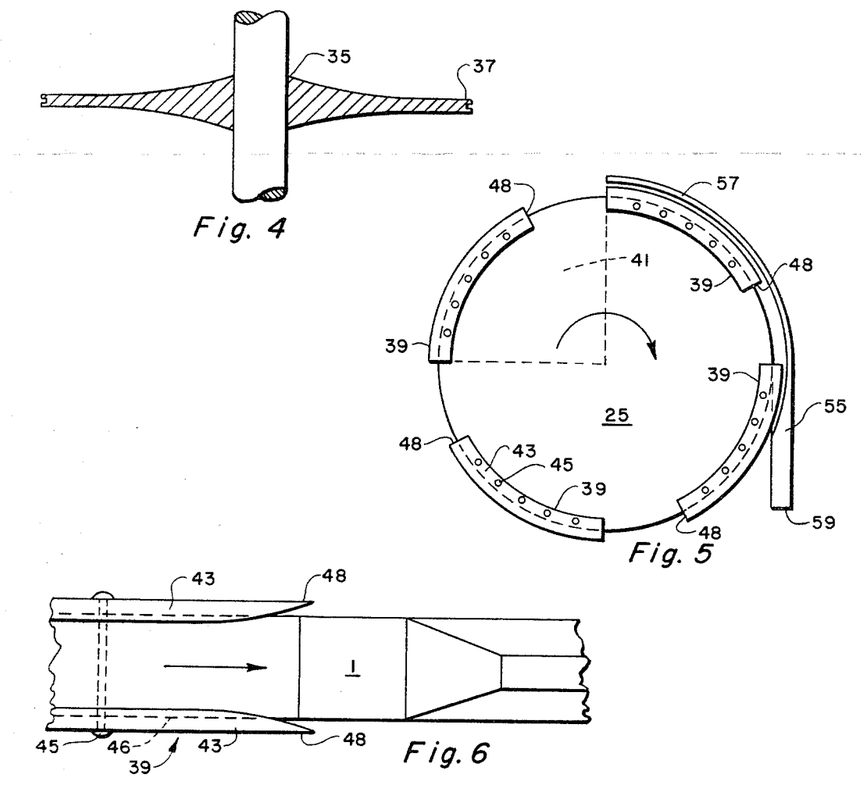
FIGURE 4 is an enlarged, central section of one of the rotating discs of the launcher shown in FIGURE 3.
FIGURE 5 is a side view of the launching disc for the launcher shown in FIGURE 3.
FIGURE 6 is an enlarged, plan view of that portion of a disc rim showing the leading end of a friction slide drive as it approaches a missile for pickup for acceleration, one missile being used for purposes of illustration in lieu of a row of ten (10) missiles.

The heart of the centrifugal launcher is the high speed launching disc 25. In the particular embodiment described herein, in order to obtain a linear launching velocity of 3,050 feet per second at the disc rim, a 4-foot diameter disc is provided and arranged for rotation at 14,600 r.p.m. Inasmuch as large stresses are induced by centrifugal force at such a high rate of speed, it would be desirable to use a hub 35 of the order of 6 inches thick at the center thereof and tapering to a narrow rim 37, of the order of $4/10$ of an inch wide, thereby to accommodate a row of 10 missiles as will be explained in detail later. It is figured that the disc can be made from material which would require a yield stress of 150,000 pounds per square inch. Accordingly, a stainless steel alloy could be used with an ultimate yield of 175,000 pounds per square inch or, if it were desired to raise the launching velocity to 3,720 feet per second, with a 49 percent increase in kinetic energy, a Be-Ni alloy having an ultimate yield at 260,000 pounds per square inch could be used.

A velocity of 3,050 feet per second is higher than the muzzle velocity of most firearms. This, of course, generates problems of loading the missiles upon the launching disc as well as retaining them on the periphery of the disc until they are intended for discharge therefrom. The loading problem takes into consideration the effect of allowing a ridge or projection on the disc to strike a stationary missile, the result being the same as though the ridge were stationary and struck by a missile traveling at rifle ball velocity, the effect being damage to or penetration of the disc and damage to the missile. In order to obviate this effect, it is contemplated by the present invention to introduce a continuous stream of missiles onto the launching disc rim at an intermediate velocity for rapid but uniform acceleration to final high velocity. At the same time, the present invention provides for simultaneous acceleration and discharge of rows of missiles each comprising 10 missiles by the periphery of the launching disc. The aforesaid problems are satisfied in part by employing friction slide drives 39 on the launching disc at uniform spaced intervals.

FIGURE 5 illustrates the arrangement of a launching disc 25 which will provide for a loading cycle for rows of 10 missiles each fed onto the disc rim 970 times per second. The disc, traveling at a velocity of 3,050 feet per second, which is calculated to travel at the rate of 243 revolutions per second, is divided into four sectors 41 each of which will pass the loading point during a period of $1.03 \times 10^{-3}$ seconds. Two and one half feet of the periphery of each sector is occupied by a friction slide drive 39, leaving a space between friction slide drives of adjacent sectors of 0.64 foot for insertion of a row of 10 missiles at a time placed side by side, that is, in aligned array.

This space is sufficient to permit insertion of a row of missiles in $2.5 \times 10^{-4}$ seconds. Since these missiles are 1.57 inches long with an effective insertion length of 1.38 inches an injection velocity of the order of 460 feet per second is required.

Figure 7:
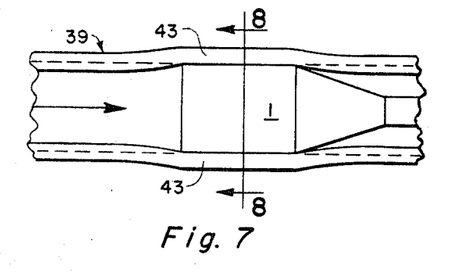
FIGURE 7 is an enlarged, plan view of another portion of a disc rim similar to FIGURE 6 but showing an intermediate section of a friction slide drive pushed outwardly by the tail of a missile.
Figure 8:
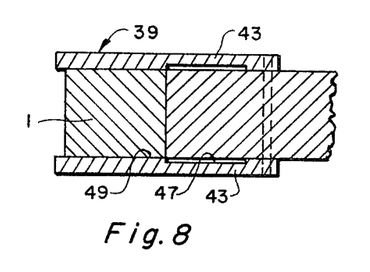
FIGURE 8 is a sectional view, taken along the line 8—8 of FIGURE 7.

The principle of the friction slide drive 39 is illustrated by FIGURES 6 through 8, wherein but a single missile is used to illustrate a row of 10 missiles. Each slide drive 39 receives missiles for conveyance from one station to another and comprises relatively thin sheets of spring steel 43 attached to opposite sides of the launcher disc rim such as by rivets 45. The flexibility of these slide drive members have a frictional resistance sufficient to engage and retain a plurality of missiles for acceleration by the disc. The steel sheets may be of the order of 0.01 inch thick for flexibility and normally overlap the edges 46 of the disc rim, as particularly shown in FIGURE 6 of the drawings. In order to facilitate overlap of the rim, the sheets may be cut away, as shown at 47 in FIGURE 8, so that the inside faces 49 will project inwardly over the edges of the disc rim. The leading edges 48 of each slide drive sheet are flared outwardly thereby to provide a gradual slope so that they are readily opened by wedge action when the missiles are delivered to and engaged by the friction slide drive sheets.

Figure 9:
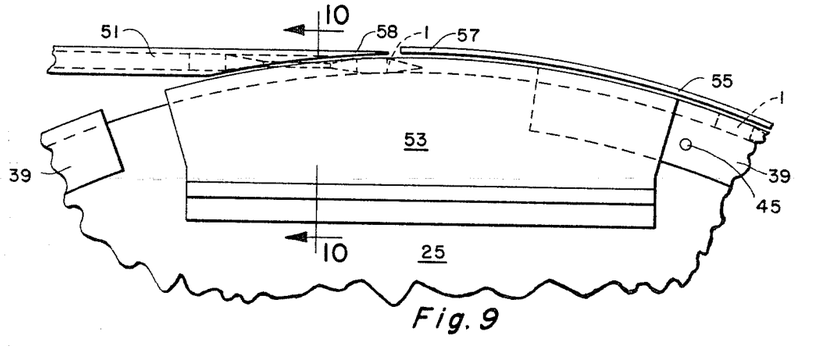
FIGURE 9 is a side view of a portion of the launching disc, showing a portion of the outer circular guide and the stationary side walls at the discharge end of the loading chute.
Figure 10:
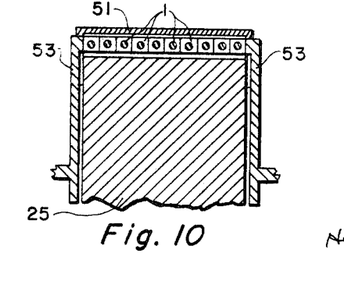
FIGURE 10 is a sectional view, taken along the line 10—10 of FIGURE 9, but showing a row of ten (10) missiles engaged by the flexible side walls.
Figure 11:
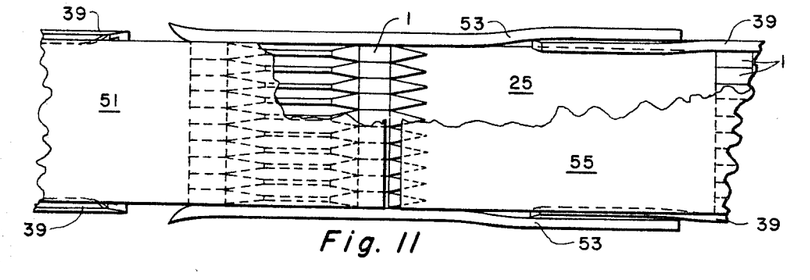
FIGURE 11 is a plan view of that portion of the launcher shown in FIGURE 9, portions of the circular guide and loading chute being cut away.
Figure 12:
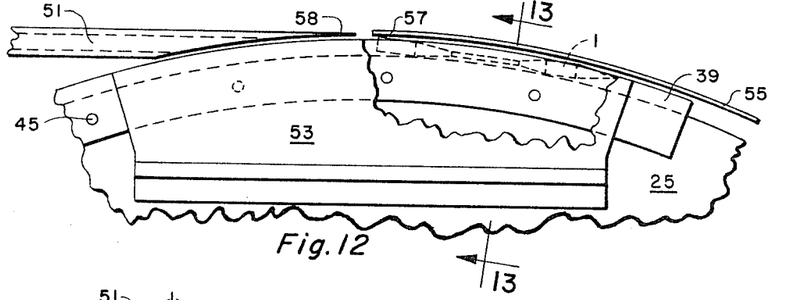
FIGURE 12 is a view similar to FIGURE 9 but showing a missile being picked up by a friction slide drive of the launching disc.
Figure 13:
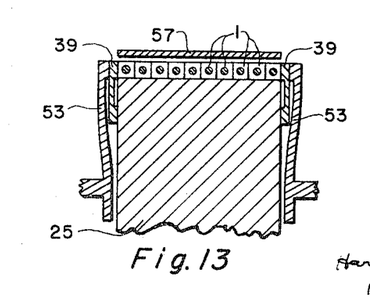
FIGURE 13 is a sectional view of the apparatus shown in FIGURE 12, taken along the line 13—13.
Figure 14:
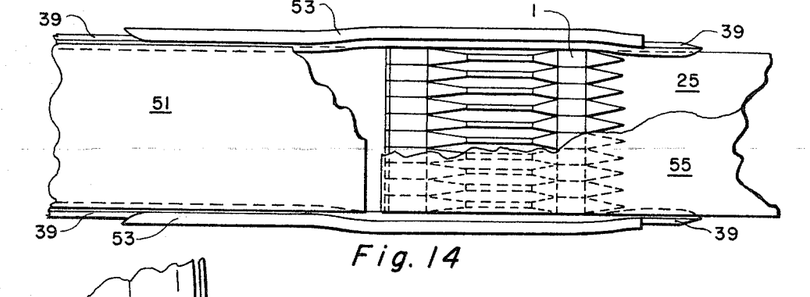
FIGURE 14 is a plan view of that portion of the apparatus shown in FIGURE 12, a portion of the circular guide being broken away.
Figure 15:
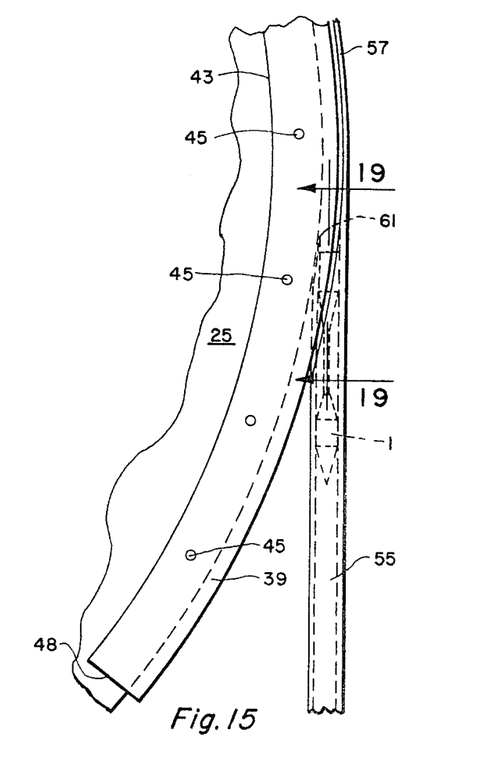
FIGURE 15 is a side view similar to FIGURES 9 and 12 but of that portion of the launching disc at the point of ejection where the missiles are guided into the ejector tube.
Figure 16:
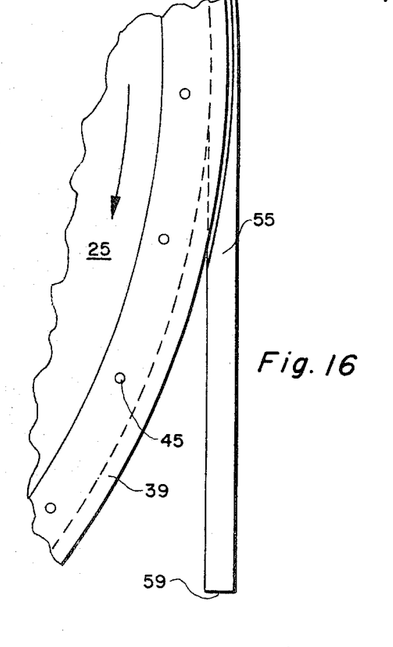
FIGURE 16 is a side view of a portion of the launching disc and the ejector tube.

Delivery of the rows of missiles from the loading disc 27 to the launching disc 25 is accomplished by centrifugal force and in a tangential direction. Between the two discs, the rows of missiles are guided or controlled by a loading chute 51 which directs them to the loading point for pick up by the launcher disc. The gap between adjacent slide drives 39 on the loading disc provides the periphery of the disc with an opening for receiving the rows of missiles. At the loading point, there would be no protection for containing the rows of missiles as they leave the loading chute until they are picked up by the slide drives. Therefore, stationary side walls 53 are provided on opposite sides of the launching disc at the loading point, as shown in FIGURE 9. The side walls are attached in any convenient manner to the framework of the apparatus in such a manner that they are stationary relative to the launching disc, but with the periphery of the disc disposed for rotary movement between them. They are spaced apart normally a distance slightly less than the overall width of a row of missiles. The walls are sufficiently flexible and exert lateral pressure enough to hold the row of missiles together, as shown in FIGURE 10, until they are picked up by the friction slide drive, as shown by FIGURE 13. Flexibility of the side walls allows the friction slide drives 39 to be pushed between the side walls 53 and the end missiles in the row, as shown in FIGURES 13 and 14. The lateral pressure imposed upon each row of missiles by the slide drive is sufficient to overcome slippage between missiles, which otherwise would be imposed upon them as they are picked up by the slide drive for acceleration by the launching disc, and smoothly accelerate them to the velocity of the launcher disc by the time they reach the end of the circular guide 55 where they are stripped for discharge tangentially.

The successive rows of missiles are propelled in a circumferential path by the launcher disc from the loading chute 51 to a point where they are stripped for discharge to the target area. In order to accomplish this, a circular guide in the form of a launching chute or hollow tube 55 is provided. One end 57 of the launching chute extends arcuately around the launching disc in proximity to the periphery thereof as well as the end 58 of the loading chute. The opposite free end 59 is open and directed in a manner for launching the missiles toward a target area. The end 61 of the floor of the launching tube, which is adjacent to the disc, rides the rim of the launching disc thereby to strip the missiles from the disc and force them to follow a tangential path. The interior of the launching chute adjacent to the open end 59 is divided into separate missile tubes by partitions 63 which are given sufficient divergence to cover the intended target area. As shown particularly in FIGURES 17 and 18, the ejector tubes are arranged with an angular divergence so as to cover parallel strips in the direction of the plane axis.

In order to offset the impact resulting from a relatively stationary missile being struck by the high velocity launching disc, an intermediate loading disc 27 is provided which receives the missiles from a storage bin and feeder and delivers them to the launching disc. The loading disc 27 is constructed similar to the launching disc 25 and is journalled for rotation in a common plane and opposite to that of the launching disc. Their respective rims are disposed in a common plane and adjacent to each other at the transfer point where both rims are traveling in the same direction.

Figure 20:
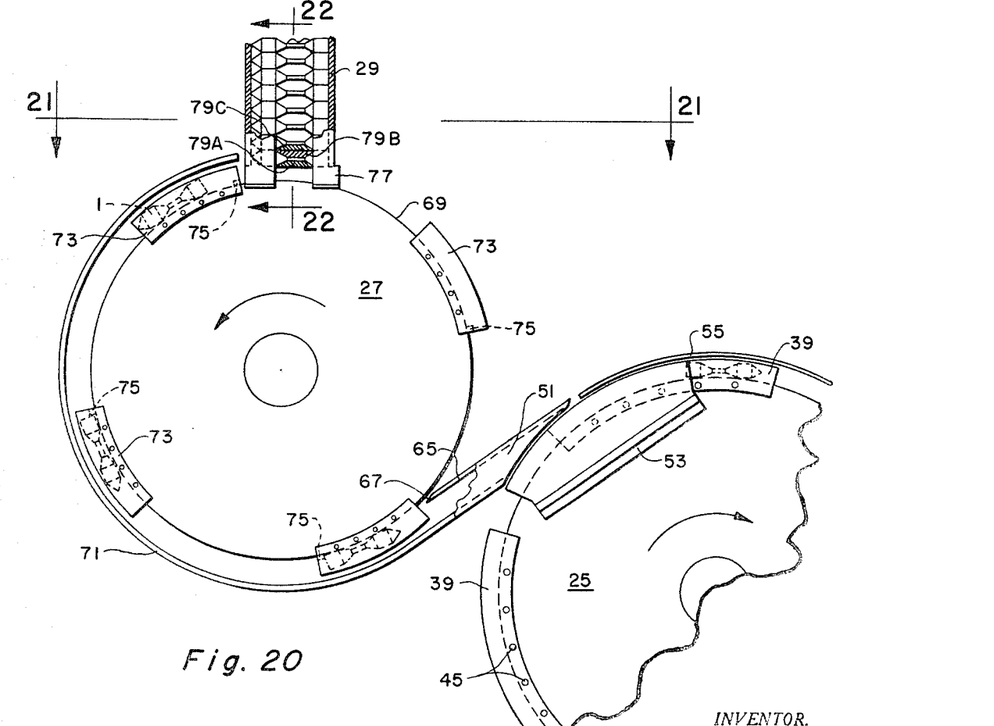
FIGURE 20 is a side view of the feeder stack, the loading disc, and the launching disc, portions of the feeder stack being broken away.
Figure 21:
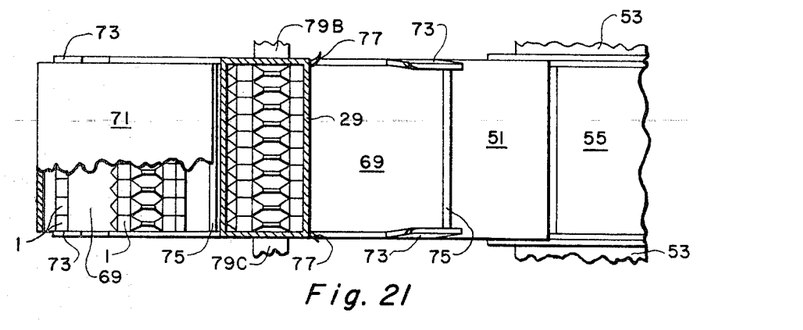
FIGURE 21 is a sectional, plan view of the apparatus shown in FIGURE 20, taken along the line 21—21, portions thereof being broken away.

The loading disc of the present embodiment is designed with a diameter of 38.8 inches. It is revolved at a rate which will deliver the missiles to the launching disc with a tangential velocity of 460 feet per second. The feed of the missiles must be synchronized with the gaps between the friction slide drives 39 on the launching disc. The loading or transfer chute 51 is provided for containing the missiles during transfer from the loading disc to the launching disc. The side 65 of the loading chute, at the end 67 thereof which is adjacent to the loading disc, is disposed close to the rim 69 of the loading disc for stripping the missiles from the loading disc and guiding them in a tangential direction. The loading disc is also provided with a stationary outer guide 71 which is disposed close to the rim of the loading disc and extends from the feeder stacks 29 circumferentially around the disc to the loading chute 51.

A plurality of friction slide drives 73 are provided at spaced intervals around the circumference of the loading disc. The loading disc slide drives are constructed and function similarly to the friction slide drives 39 provided on the launching disc. However, the walls of the loading disc slide drives are designed not to accelerate the missiles to full rim speed until they slide back against a backstop 75 provided at the rear of the slide drive walls. The backstops serve not only to accelerate the missiles to the speed of the loading disc rim, but also function to accurately position the rows of missiles with respect to the loader disc rim which is geared to the launcher disc drive so that, for a calculated length of loading chute to the launcher disc, the rows of missiles will reach the launcher disc in the spaces between the launcher disc slide drives at the proper time. In order that the stops will clear the loading chute, the side 65 which is used to strip the missiles from the loading disc is spaced from the rim a sufficient amount to provide clearance and yet engage the missiles.

Figures 17, 18, 19, 22:
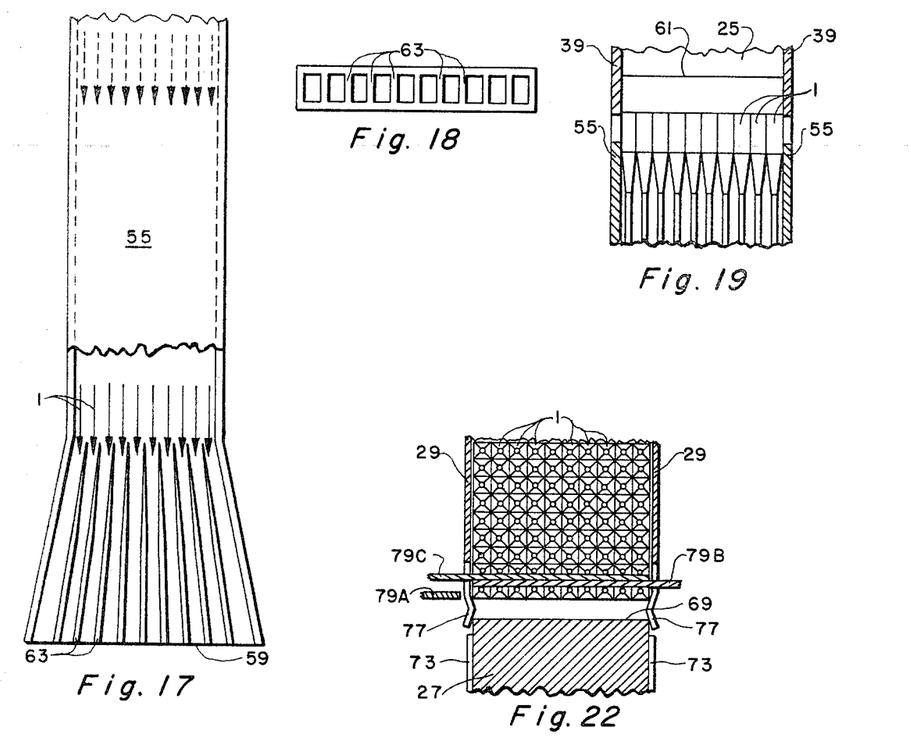
FIGURE 17 is a plan view of the ejector tube, portions of the outer wall being broken away to show the partitions.
FIGURE 18 is an end view of the ejector tube shown in FIGURE 17.
FIGURE 19 is a sectional view of a portion of the apparatus shown in FIGURE 15, taken along the line 19—19.
FIGURE 22 is an enlarged, sectional view of the feeder stack, taken along the line 22 of FIGURE 20.

In view of the contemplated velocity of the loader disc rim being selected at 460 feet per second, to secure a fire rate of 970 missiles per target path per second, a row of 10 missiles must be placed on the loader disc rim every $1.03 \times 10^{-3}$ seconds. In order to accomplish this, the mechanism of the feeder stack 29 must create a downward feed phase of the order of $2.57 \times 10^{-4}$ seconds which requires a maximum downward fed velocity of 26 feet per second. The rows of missiles would have a tendency to bounce as they hit the loader disc rim at this velocity. This can be prevented by disposing flexible brake boards 77 along opposite sides of the loader disc rim which will slow the descent of each missile row before it hits the rim. The brake boards are located in a position which will allow the walls of the loading disc slide drives to push them aside for engagement and acceleration of the rows of missiles by the drives.

Figure 23A:
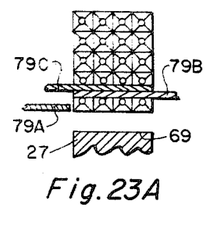
FIGURES 23A, 23B, 23C, 23D are a series of views illustrating the phase relations of the column feed plates.

Positive feed of the rows of missiles onto the loader disc rim is accomplished by a plurality of feeder drive plates 79 because the missiles in the feeder stack would not fall sufficiently rapidly under the force of gravity and necessitate being driven down at the required feed rate. The drive plates are disposed one above the other in spaced apart relation in a manner to penetrate between rows of missiles as they are fed intermittently downwardly through the feeder stack 29. The plates are of a thickness which will enable them to be inserted into and withdrawn from the space between the long slender portions 17 of consecutive rows of missiles in the feeder stack. This is accomplished by the feeder plates being operated through a cycle which is divided into four phases of $2.57 \times 10^{-4}$ seconds each and which is particularly illustrated by FIGURES 23A, B, C, and D. At the beginning of phase 1, shown by FIGURE 23A, feeder plate 79A has been withdrawn or pulled back out of the way of the first row of missiles, while plates 79B and 79C are disposed between the first and second rows of missiles. The missiles in the bottom row, that is, the missiles in the row beneath plate 79B do not fall separately under the influence of gravity when plate 79A is withdrawn since the acceleration of gravity is too slow to have much effect as compared to the drive force required to displace the row down 1 millimeter in $2.57 \times 10^{-4}$ seconds.

Figure 23B:
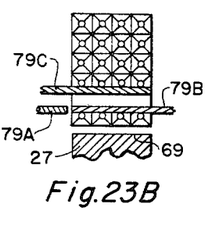

At the start of phase 2, the plate 79B has forced the first row of missiles down onto the loader disc rim 69 between successive friction slide drives while plate 79C holds back the next succeeding rows of missiles in the feeder stack 29. During this phase, plate 79A remains withdrawn from the rows of missiles and plate 79C remains inserted under the rows of missiles in the stack.

Figure 23C:
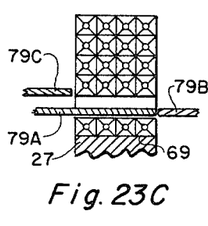
Figure 23D:
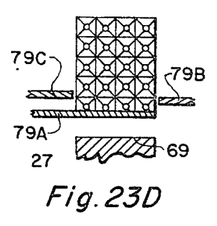

In phase 3, shown by FIGURE 23C, plate 79A has been inserted and plates 79B and 79C are withdrawn. At the start of phase 4, the stack of missiles has been driven down onto the lower plate 79A, as shown in FIGURE 23D, thereby positioning the missile rows in the stack for insertion of plates 79B and 79C in readiness to commence phase 1 and repeat the cycle after withdrawal of plate 79A preparatory for release of the next row of missiles to be driven onto the loader disc rim.

It will be noted that the drive plates 79A and 79C slide back and forth horizontally in their respective planes while plate 79B not only slides back and forth but also moves up and down approximately 1 millimeter. The mechanism for effecting these movements of the drive plates is not shown inasmuch as any suitable device can be provided to effect this action and in the time required to deliver them to the loader disc. Likewise, the mechanism for transferring the missiles from the missile hoppers 31 to the feeder stack 29 is not shown since any suitable arrangement can be provided which will orient the missiles properly and deliver them to the feeder stack. By the same token, the driving mechanism for rotating the loader and discharge discs is illustrated only schematically since any suitable source of power capable of effecting the desired velocities is contemplated.

It will now be apparent to those persons skilled in the art that the present invention provides a relatively simplified apparatus capable of discharging a multiplicity of lightweight missiles at supersonic speeds. Although the apparatus utilizes the well known principle involving centrifugal force to discharge the missiles, it does so advantageously in a way which will accelerate them to supersonic speed without injury to the missiles or the apparatus. In addition, the apparatus is capable of accommodating a large supply of lethal missiles and is of a size making it practical for use in airplanes.

Although but a single, preferred embodiment of the present invention is shown and described herein, it will become apparent undoubtedly to those persons skilled in the art that other forms thereof, as well as changes in the particular one described, are possible within the spirit and scope of the present invention. Therefore, it is desired that the present invention shall not be limited except insofar as is made necessary by the prior art and by the spirit of the appended claims.

What is claimed is:

1. A centrifugal gun comprising:
   at least two disc members disposed in a common plane and mounted for independent rotation;
   means for rotating said members respectively at different speeds;
   each of said disc members including means on the circumferential periphery thereof for receiving missiles for conveyance from one station to another station;
   means for delivering said missiles to the slower rotating member;
   means for transferring said missiles from said slower rotating member to the faster rotating member; and
   means for stripping said missiles from said faster rotating member for guidance in a selected direction.

2. The invention as defined in claim 1 wherein said receiving means comprises flexible members disposed in spaced apart relation on said rotatable members in a manner to frictionally engage said missiles.

3. The invention as defined in claim 2 wherein said missile delivery means comprises storage means and means for intermittently driving missiles from said storage means onto said slower rotating member, said driving means being synchronized with said slower rotating member in a manner to deliver said missiles into the path of said receiving means for engagement thereby.

4. The invention as defined in claim 1 wherein said receiving means comprises pairs of flexible members disposed respectively on opposite sides of the periphery of said discs, respective pairs on each disc being disposed correspondingly and uniformly at intervals on each disc.

5. The invention as defined in claim 4 wherein said pairs of flexible members are disposed apart a distance slightly less than the combined width of said missiles incident to disposal on said discs, the flexibility of said flexible members having a frictional resistance sufficient to engage and retain said missiles for acceleration by said discs.

6. In a centrifugal gun in combination, a pair of discs mounted for rotation, means for rotating said discs at respectively different speeds, storage means, a multiplicity of missiles disposed in said storage means, means for feeding said missile successively to the slower rotating disc, means for transferring said missiles from said slower rotating disc to the faster rotating disc, means on the circumferential surfaces of each of said discs for receiving and conveying said missiles for acceleration by said discs between spaced apart stations associated therewith, and means for tangentially discharging said missiles from said faster rotating discs in a selected direction.

7. The invention as defined in claim 6 wherein said missiles comprise needlelike members having a head portion, and an afterbody portion which is of reduced cross section as compared with said head portion.

8. The invention as defined in claim 7 wherein said head portion is made from heavier material than that of said afterbody portion for flight stability.

9. The invention as defined in claim 8 wherein said receiving and conveying means comprises pairs of flexible members disposed respectively at uniform intervals on the circumferential surface of said discs, respective ones of said pairs being disposed spaced apart on opposite sides of the disc.

10. The invention as defined in claim 9 wherein the members of each pair of flexible members are disposed apart a distance slightly less than the overall width of missiles to be received thereby, the flexibility of said flexible members having a coefficient of friction sufficient to engage and retain said missiles for acceleration by said discs.

11. The invention as defined in claim 10 wherein said discharging means includes means for diverting said missiles responsive to discharge from said faster rotating disc.

12. The invention as defined in claim 6 wherein said discs are mounted for rotation in a common plane in opposite directions, said transfer means being disposed between said discs in the area where their peripheries are moving in the same direction.

13. The invention as defined in claim 12 wherein said receiving and conveying means comprises pairs of flexible members disposed apart at spaced intervals on said discs, and said feeding means is synchronized with the spaced intervals on said slower rotating disc for delivering missiles into the path of said receiving and conveying means associated therewith.

14. The invention as defined in claim 13 wherein said feeding means comprises means for delivering a plurality of missiles in aligned array to said slower rotating disc.

15. The invention as defined in claim 14 wherein the members of each pair of flexible members are disposed apart a distance slightly less than the overall width of each group of aligned missiles, the flexibility of said flexible members having a coefficient of friction sufficient to engage and retain said missiles in alignment for acceleration by said discs.

References Cited

UNITED STATES PATENTS

| 1,276,892 | 8/1918 | Fender | 244—3.27 |
| 2,815,699 | 12/1957 | Davis | 89—33 |
| 3,148,472 | 9/1964 | Hegge et al. | 102—93 X |

FOREIGN PATENTS

| 399,055 | 10/1942 | Italy. |

SAMUEL W. ENGLE, *Primary Examiner.*